W. W. TUTTLE.
Grain Drill.
No. 40,780. Patented Dec. 1, 1863.
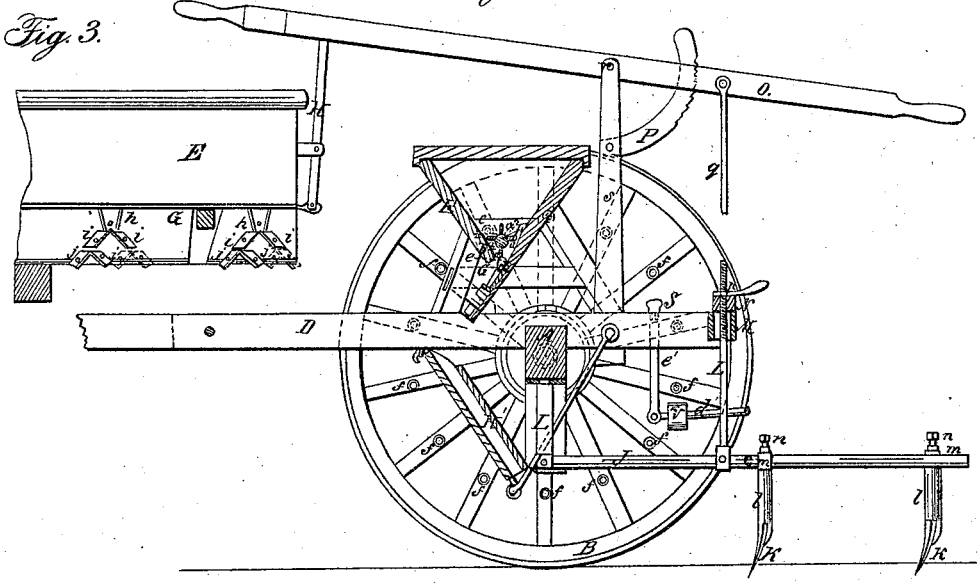
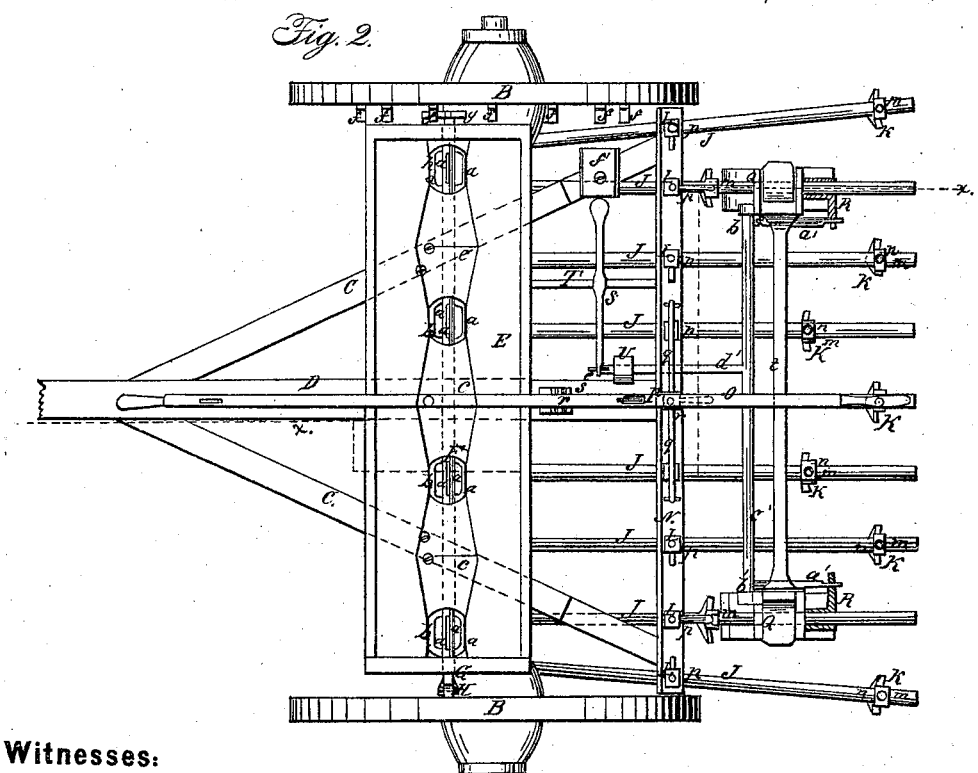
Witnesses: Inventor:

UNITED STATES PATENT OFFICE.

W. W. TUTTLE, OF GRATIOT, WISCONSIN.

IMPROVEMENT IN GRAIN-DRILLS.

Specification forming part of Letters Patent No. 40,780, dated December 1, 1863.

*To all whom it may concern:*

Be it known that I, W. W. TUTTLE, of Gratiot, in the county of Lafayette and State of Wisconsin, have invented a new and Improved Seed-Planting Machine; and I do hereby declare that the following is a full, clear, and exact description of the same, reference being had to the accompanying drawings, making a part of this specification, in which—

Figure 1 is a side sectional view of my invention, taken in line $x$ $x$, Fig. 2; Fig. 2, a plan or top view of the same; Fig. 3, a front view of a portion of the same.

Similar letters of reference indicate corresponding parts in the several figures.

To enable those skilled in the art to fully understand and construct my invention, I will proceed to describe it.

A represents an axle having a wheel, B, at each end, hounds C C and draft-pole D attached.

E is a seed box or hopper, the front and back of which are inclined. This seed box or hopper extends nearly the whole length of the axle A, and it has a shaft, F, fitted longitudinally at its lower part, on which shaft a series of radial wings, $a$, are placed in sets of four, said sets being at equal distances apart, as shown clearly in Fig. 2. These wings $a$ work in ellipsoidal recesses $b$, made in the bottom of the seed box or hopper E, and the shaft F, between these recesses $b$, is covered by caps $c$, of double-inclined form, which have a tendency to cause the seed to pass down to the recesses $b$, and which prevent the seed from coming in contact with shaft F between said recesses.

At the bottom of the seed-box E there is a slide-bar, G, which is perforated with holes $d$, and has a lever, H, attached to one end of it. By adjusting this lever H the bar G may be moved laterally and its perforations $d$ made to register more or less uniformly with holes or openings $e$ in the bottoms of the recesses $b$ and the discharge of seed regulated as may be desired.

The seed is discharged by the wings $a$, rotated by the shaft F, the latter being rotated from one of the wheels B, which has a series of pins projecting from its inner side, with friction-rollers $f$ on them, which come in contact with a pointed wheel, $g$, at one end of shaft F. By this arrangement all gearing is dispensed with, much friction avoided, and the device rendered capable of being very readily repaired in case of the breaking or giving way of any of the parts.

The back of the seed box or hopper E is prolonged so that it will extend down in front some distance, and it has spouts $h$ attached to it, which lead direct from the perforations $d$ in the slide G, and the inclined spouts $i$ $i$ are attached to said back end and at the lower end of each spout $h$, so as to receive the seed therefrom, divide it, and direct in two different directions, and at the lower end of each spout $i$ there are also two similar spouts, $j$ $j$, which again divide the seed from the spouts $i$. By this means the seed discharged from the seed-box through four apertures is well distributed over an area extending the whole length of said box. The seed passes from the spouts $j$ $j$ into a narrow inclined box, H', which is suspended from the hounds C C and extends the whole length of the seed-box E. This box H' has an inclined position, as shown in Fig. 1, and it completes the scattering of the seed and prevents the latter being unduly acted upon by the wind, the seed being discharged from box H' directly underneath the axle A.

To the axle A there are attached a series of pendent bars, I, to the lower ends of which there are secured by pivots $k$ rods J, which are allowed to turn on the pivots $k$. These rods J have each a share, K, attached to them, said shares being provided with shanks $l$, which have eyes $m$ at their upper ends, said eyes fitting on the rods J and secured thereto by set-screws $n$. By this arrangement the shares K may be adjusted farther forward or back on the rods J, so as to be in line with each other or in zigzag form.

To each rod J there is attached by a pivot, $o$, a vertical rod, L. These rods L extend up through a bar, M, attached to the back ends of the hounds C, and they also pass through a bar, N, which is directly over the bar M. The upper parts of the rods L have screw-threads cut on them to receive thumb-nuts $p$, by adjusting which the shares K may be made to penetrate a greater of less distance into the earth, as may be required. The bar N is connected by rods $q$ $q$ to a lever, O, the fulcrum $r$ of which is at the upper end of an upright, $s$, attached to the back part of the draft-pole D. This lever O has a slot made in it to allow a segment-rack, P, which is attached to the upright $s$, to pass through. By forcing down the front end of the lever O the back part of the same will be raised, and also the bar N and shares K, the back part of the lever O being sustained or held up by the segment-rack P.

Having thus described my invention, what I claim as new, and desire to secure by Letters Patent, is—

1. The wings $a$, attached to the shaft F, and fitted in ellipsoidal recesses $b$, for the purpose of discharging the seed from the box E, as set forth.

2. The scattering device formed of the spouts $k\ i\ j$ and the box H', arranged as set forth.

W. W. TUTTLE.

Witnesses:
M. HOLLISTER,
HENRY H. ENSIGN.